(12) United States Patent
Zadiraka et al.

(10) Patent No.: US 6,558,638 B2
(45) Date of Patent: May 6, 2003

(54) TREATMENT OF LIQUIDS

(75) Inventors: Yuri Vladimirovich Zadiraka, Edinburgh (GB); Eduard Mikhailovich Barkhudarov, Moscow (RU); Igor Antonovich Kossyi, Moscow (RU); Merab Ivanovich Taktakishvili, Moscow (RU)

(73) Assignee: Splits Technologies Limited, East Lothian (GB)

( * ) Notice: Subject to any disclaimer, the term of this patent is extended or adjusted under 35 U.S.C. 154(b) by 0 days.

(21) Appl. No.: 09/875,293

(22) Filed: Jun. 7, 2001

(65) Prior Publication Data

US 2002/0014400 A1 Feb. 7, 2002

Related U.S. Application Data

(63) Continuation-in-part of application No. 09/445,758, filed on Dec. 10, 1999, now abandoned.

(30) Foreign Application Priority Data

Mar. 14, 1998 (GB) .............................................. 9805419

(51) Int. Cl.7 ................................................. B01J 19/08
(52) U.S. Cl. ............................ 422/186.04; 422/186.07; 204/164
(58) Field of Search ....................... 422/186.04, 186.07; 204/164

(56) References Cited

U.S. PATENT DOCUMENTS 5,630,915 A * 5/1997 Greene et al. ............... 204/164
5,766,447 A * 6/1998 Creijghton .................. 204/164

FOREIGN PATENT DOCUMENTS

| EP | 0 431 190 | 6/1991 |
| WO | 97/23285 | 7/1997 |

* cited by examiner

Primary Examiner—James J. Seidleck
Assistant Examiner—Thao Tran
(74) Attorney, Agent, or Firm—Venable; Norman N. Kunitz (57) ABSTRACT

The present invention provides an apparatus suitable for use in the treatment of liquid 31, comprising a high voltage electric discharge device 8 with spaced apart first second electrodes 24,25. The discharge device has electrical power supply control means 13 for applying a series of high voltage pulses across said first and second electrodes 24,25 50 as to produce an extended area electrical discharge in an electric discharge zone 37 extending between said first and second electrodes. The apparatus also has a gas delivery means 14–18,29 for feeding a series of bubbles 36 of gas into the liquid in said electric discharge zone. The present invention also provides methods of producing an electrical discharge in a liquid and of decontaminating water and other liquids using the apparatus of the invention.

9 Claims, 4 Drawing Sheets

TREATMENT OF LIQUIDS

CROSS-REFERENCE TO RELATED APPLICATION

This application is a continuation-in-part of application No. 09/445,758 filed Dec. 10, 1999 now abandoned.

This application claims the priority of United Kingdom Application No. 9805419.0 filed Mar. 14, 1998, which is incorporated herein by reference.

BACKGROUND OF THE INVENTION

The present invention relates to the treatment of liquids, and more particularly to the treatment thereof so as to improve them through processing, e.g. inactivation or decomposition, of materials dissolved or suspended therein.

Electrical discharge is widely known in gases with various practical applications e.g. for lighting, cutting through metals etc. It is also known in principle that such an electrical discharge can be obtained inside a liquid. To date though this has not found any significant practical application due to inter alia the very short working life of the electrodes in the devices used.

SUMMARY OF THE INVENTION

It is an object of the present invention to avoid or reduce one or more of the above disadvantages.

The present invention provides an apparatus suitable for use in the treatment of a liquid, said apparatus comprising a high voltage electric discharge device with a first electrode and a second electrode spaced apart from said first electrode, said discharge device including electrical power supply control means formed and arranged for applying a series of high voltage pulses across said first and second electrodes in use of the apparatus with said device connected to an electrical power supply so as to produce, in use of the apparatus, an extended area electrical discharge in an electric discharge zone extending between first and second electrodes, said apparatus including a gas delivery means formed and arranged for feeding a series of bubbles of gas into a body of liquid in said electric discharge zone in use of said apparatus.

Thus with an apparatus of the present invention it is possible to generate an electrical discharge inside a liquid for treatment of the liquid, with a relatively low voltage electrical power supply and in a way which results in substantially increased working life of the discharge device, with associated economy of construction, etc. Without in any way wishing to restrict the scope of the present invention, it is believed that a significant factor in the reduced voltage threshold required to establish the electrical discharge within the liquid in use of apparatus of the present invention is the generation of electrical discharge within the bubbles of gas passing between the electrodes.

The generation of a pulsed electrical discharge inside a liquid can induce various different and more or less powerful effects in the liquid depending on the form and type of apparatus of the invention used, which can have a strong effect on various materials present in the liquid. In general, within the immediate vicinity of the plasma discharge there are generated various more or less active species such as hydrated electrons, ions, excited atoms, and free radicals, which can react with materials present in the liquid. Zones of liquid extending beyond the immediate vicinity of the plasma discharge can be affected by UV-radiation. In the case of water containing trace amounts of material such as may be encountered in water being treated for domestic consumption, such zones may extend up to 6 cms or more. The extent of such zones will naturally depend on various factors such as the intensity of the plasma discharge which in turn may depend to a greater or lesser extent on such factors as the voltage of the pulses used for the electrical discharge; and on the OD (optical density or absorbance of the liquid and any material dissolved or suspended in it). Acoustic and shock waves may also be generated by the plasma discharge. By using suitable geometric arrangements of secondary electrodes e.g. generally toroidal, it is possible to combine and concentrate such shock waves for even greater cumulative effect. It will moreover be appreciated that unlike with conventional UV-irradiation apparatus, various embodiments of the apparatus of the present invention will have significantly more powerful effect from the UV-irradiation alone due to the avoidance of any barriers to UV-transmission between the source and the liquid being treated. Even quartz glass which has above average UV-transmission characteristics, substantially attenuates UV-radiation with a wavelength of less than 200 nm. In addition, in at least some forms, the present invention can provide more or less significant synergistic effects through the combination of the UV-radiation, acoustic/shock waves generated, and plasma-chemical and photo-chemical reactions. This may be particularly significant in the treatment of liquids containing micro-organisms such as bacteria, so as to kill or inactivate these in order effectively to sterilise the liquid. The apparatus of the present invention may also be used to treat particular resistant infectious agents such as protozoal oocysts and prions.

Various liquids may be treated by use of the present invention, but the apparatus of the present invention is especially useful for the treatment of water contaminated with various different kinds of materials in order to improve the quality of the water, reduce environmental pollution etc. Thus the present invention may be used by public utility companies for the treatment of water supplied for consumption and running pools, and other uses, and for the treatment of waste water. Other liquids that may be mentioned as suitable for treatment include oils, for example used or waste transformer oil containing more or less toxic additives (e.g. PCBs—polychlorinated biphenyls) required for improving its performance, which require to be neutralised to facilitate safe disposal of the oil. Thus the present invention may also be used to decompose hazardous or toxic organo-chemicals into more or less safe and/or easily biodegradable substances. Other organochemicals which may be mentioned as suitable for neutralisation to a greater or lesser extent by means of the present invention include alkanols e.g. methanol; aldehydes e.g. formaldehyde; phenol and substituted phenols e.g. para-chlorophenol; etc. Other applications of the present invention which may be mentioned include activation of oils and generation of ultrasound for medical purposes.

It will be appreciated that various configurations and geometries of electric discharge device and of the electrodes used therein may be used in accordance with the present invention. In a first preferred form of the invention, the first and second electrodes are substantially spaced apart and there is provided a multiplicity of spaced apart secondary electrodes distributed between opposed portions of said first and second electrodes. Conveniently there is used a device form which has a generally annular electric discharge zone, which may be defined by an internal or external cylindrical surface, and having a longitudinal axis which may be substantially rectilinear, or arcuate to a greater or lesser extent e.g. circular (corresponding to a toroidal discharge surface) or helical, and extending between generally annular opposed portions of the first and second electrodes. With such non-rectilinear axis electric discharge zones it will be appreciated that there may be obtained a degree of interaction between shock or acoustic waves generated by the electric discharge, for example, to produce a more focused and intense cumulative effect.

In the above described first form of the invention, the first electrode may also have an elongate portion extending generally parallel to the electric discharge surface and insulated therefrom by a suitable solid insulator dielectric. Thus, for example, with an external electric discharge surface, said first electrode elongate portion could be in the form of a conductor extending generally along the central longitudinal axis of the electric discharge surface. Conveniently the electric discharge surface is provided on the outside of a tubular insulator with an internal passage extending therealong, which is conveniently used as a gas supply passage, inside which extends said conductor. In some cases though it may be preferred to have this internal gas supply passage unobstructed by any first electrode elongate portion conductor.

Without in any way wishing to restrict the scope of the present invention, it is believed that the operating principle of the above-described first form of electric discharge device of the present invention and its main advantage are based on the sequential breakdown of a series of interelectrode gaps and quick generation of an extended multi-spark surface discharge. At the initial point as the capacitance of the interelectrode gap is much less than the capacitance between the electrode and central conductor (said first electrode elongate portion), almost all voltage is applied to the first interelectrode gap (between the first and second electrodes). The sequence of successive breakdowns between the neighbouring electrodes results in the electric discharge being propagated from the first electrode portion to the second electrode via the secondary electrodes along the metal-dielectric surface until the gap between the first electrode portion and the second electrode portion is fully bridged by a high-voltage pulse discharge of the kind sometimes referred to as "slipping surface" discharge. Thus the threshold of electric discharge initiation is decreased significantly and is close to the threshold of discharge between the two neighbouring electrodes e.g. the first electrode portion and the first one of the secondary electrodes. The use of the first electrode elongate portion has the particular advantage of substantially reducing, typically by 10 to 100 times, the threshold voltage required to initiate the electric spark discharge in a given device relative to that required in the same device without such a first electrode elongate portion extending alongside the electric discharge surface.

By dimensioning the internal passage in the above-described type of arrangement of the first form of the invention, to have a diameter somewhat greater than that of the conductor, the passage can also serve as a conduit for gas as part of the gas delivery means. In this case the conduit may be connected to the discharge surface by a plurality of passages extending through the insulator, which may be in the form of discrete space apart passages. Alternatively there could be used an insulator with a porous or honeycombed structure providing a large multiplicity of gas passages extending therethrough and which may be interconnected with each other to a greater or lesser extent.

Advantageously only opposed electrode portions are exposed, other portions of the first and second electrodes being covered in solid dielectric insulator material. Thus in the case where the first and second electrodes have cylindrical outer surfaces, these outer surfaces are covered in solid dielectric insulator material. With such preferred forms of the device of the invention it is possible to treat reasonably efficiently liquids with relatively high conductivities, such as waste water in coastal treatment works where a greater or lesser amount of salt may be present (typical conductivities of 1400 to 2000 $\mu$siemens $cm^{-1}$), blood waste including whole blood (typical conductivities of up to around 5400 $\mu$siemens $cm^{-1}$) and waste water which has been used to wash down blood soaked areas (typical conductivities of around 2500 $\mu$siemens $cm^{-1}$), and pot ale—which is waste from whisky production and the like (typical conductivities of 2500 $\mu$siemens $cm^{-1}$). In more detail, with these preferred forms of device, energy losses due to current passing through the liquid are reduced. Also the voltage required to initiate the electric arc discharge may be significantly reduced. Thus it may be possible to treat liquids with relatively high conductivities, for example, up to 50,000 $\mu$siemens $cm^{-1}$, possibly up to 80,000 $\mu$siemens $cm^{-1}$.

Advantageously in the case of the first form of the invention in which annular first and second electrodes and secondary electrodes therebetween, mounted on a tubular insulator, are used, the tubular insulator is recessed underneath the opposed electrode portions so that in use of the apparatus the series of bubbles of gas is mixed with the liquid before entering the electric discharge zone between the opposed electrode portions. Furthermore where the device is used in a configuration wherein the tubular insulator on which the annular electrodes are mounted, extends generally vertically, then it is preferred that the gas supply passage outlets between opposed electrode portions (of said first and second and secondary electrodes), are disposed in close proximity to the upper ones of the respective pairs of opposed electrode portions. These modifications tend to increase the content of gas in the liquid in the electric discharge zone and to increase the residence time of gas bubbles therein, and thus have the advantage of inter alia reducing the amount of gas which needs to be pumped through the gas supply passages, thereby reducing the operating costs of the apparatus.

Advantageously the tubular insulator is provided with channel form recesses underneath said opposed electrode portions of said generally annular first and second electrodes, whereby in use of said apparatus the series of bubbles of gas is mixed with said liquid before entering said electric discharge zone between the opposed electrode portions.

In a second preferred form of the invention, the first and second electrodes are in the form of generally planar members in opposed relation, each having a plurality of apertures therein for the passage of liquid through first one and then the other of said electrodes via said electric discharge zone extending therebetween.

This second form of the invention is particularly suitable for use in continuous flow treatment of liquids for example, in public utility water supply systems. In this type of application, the first and second electrodes are mounted so as to extend substantially across the whole of the liquid is treated. The apertures in the first and second electrodes are generally formed and arranged in order to avoid creating excessive flow resistance whilst also providing a relatively substantial electrode structure resistant to erosion and low electrical resistance within the electrode structure itself. Desirably the electrodes are of a substantially uniform, e.g. honeycomb-like, structure across their transverse extent, with optionally an outer annular support or reinforcing portion.

Where required, e.g. in order to provide multiple discharge treatments of a given body of water passing through the flow passage, and/or in order to ensure that all parts of the flow stream (along its longitudinal extent) are subjected to an effective discharge treatment—especially in the case of high flow rates, a plurality of opposed first and second electrodes may be used. This may be effected by the use of a series of devices mounted along the flow passage, or, more conveniently, by using a series of first and second electrode pairings connected (in parallel or series) to a common voltage supply means. In such cases the first and second electrode pairings may conveniently be spaced apart from each other by from 2 to 10 cms, advantageously from 3 to 8 cms, for example about 6 cms. The first and second electrodes in the or each pairing are generally spaced apart from each other by from 0.2 to 2 cms, preferably from 0.5 to 1 cms.

As noted above, the electrodes may have various different forms corresponding to different proportions of electrode area v. aperture area. Typically the aperture area may comprise from 30 to 98% of the total area of the electrode (corresponding to an electrode material area of from 70 to 2% of the total area). Desirably the aperture area comprises from 50 to 95%, for example, from 70 to 90%, of the total electrode area.

In a third preferred form of the invention, the first electrode is provided at a nozzle means formed and arranged for directing, in use of the apparatus, a stream of said liquid onto said second electrode, said gas supply means being formed and arranged for injecting, in use of the apparatus, said series of bubbles of gas into said stream.

With this third form of device the amount of liquid within which the electrical discharge is generated and which is treated directly, is generally rather more restricted as compared with the first and second forms of device. It is however also possible to use the more or less intense UV radiation generated by the plasma discharge within the stream of liquid, for irradiation treatment of other matter in proximity to said liquid stream. Thus, for example, a flow of liquid spaced apart from said liquid stream, may be treated.

With this third form of device, it will be appreciated that the electric discharge zone will have a somewhat different geometric configuration from that of the first and second types, and will be generally rod-shaped rather than tubular or sheet-form. Nevertheless, the form and arrangement of the electrodes as well as that of the electric discharge zone, may be varied considerably in this case also. In a simple arrangement the nozzle means is disposed substantially vertically above the second electrode so that a stream of liquid may simply fall under the influence of gravity down onto the second electrode. It is, however, also possible to use other arrangements in which a pressurized flow of liquid can be used to provide a jet of liquid onto a second electrode disposed other than vertically below a nozzle outlet, for example, to one side. The former type of arrangement is however generally preferred as it allows the use of a simple arrangement, e.g. a cup form recess, for collecting the liquid stream as it contacts the second electrode. Conveniently the nozzle itself is of an electrically conducting material in order that it can be used for or as the first electrode, though other arrangements are also possible e.g. with the first electrode as a partial or complete coating or nozzle tip attachment on a non-conducting nozzle. In the case of the second electrode this may also conveniently be integrated to a greater or lesser extent with a liquid stream collecting means, which generally has an enlarged diameter, and/or generally funnel-shaped, e.g. cup-shaped, inlet—especially where it is desired to use an essentially closed circuit liquid supply for the liquid stream with the liquid stream being collected and returned, via suitable return passage means and flow inducing means e.g. a pump, to the nozzle. It will of course be appreciated that the return passage means should include electrical insulation means (or conveniently be of electrically insulating material) in order to electrically isolate the electrodes from each other along said passage means.

It will be appreciated that the size and form of the electric discharge zone in this third form of the invention may be varied. Thus the diameter of the nozzle outlet, as well as to some extent the liquid pressure and/or flow rate up to and through the nozzle, will affect the form and diameter of the stream of liquid. In general it is preferred to avoid high pressures and to have a relatively non-turbulent liquid flow (other than turbulence associated with the gas bubbles). Conveniently the liquid stream has a diameter of from 1 to 10 mm, desirably from 2 to 7 mm, though substantially larger diameters may also be used if desired. The separation between the first and second electrodes may conveniently be in the range from 1 to 15 cms, advantageously from 2 to 10 cms. It will be appreciated in this connection that larger separations will generally require higher voltages.

In this third form of apparatus the gas supply is generally formed and arranged so that the injected gas is substantially entrained in the liquid flow passing out of the nozzle, as a series of relatively small gas bubbles.

In general the gas delivery means comprises passage means having outlet means at or adjacent said electric discharge zone, for feeding gas to the liquid in the electric discharge zone, and inlet means for coupling, in use of the apparatus, to a gas supply means which may comprise an active device such as a compressor or pump, and/or a passive device such as a reservoir of compressed gas provided with a gas flow regulator means.

In general the gas delivery and supply means may be formed and arranged to feed gas to the liquid in said electric discharge zone at a wide variety of pressures and/or flow rates depending on various factors such as the gas used, the nature of the liquid, the size, shape and configuration of the electric discharge surface, the ambient pressure at the electric discharge surface, the high voltage pulse frequency etc. In the case of the first device form with multiple secondary electrodes, there may be used a gas feeding rate of at least 30 l hr$^{-1}$, conveniently from 30 to 100 l hr$^{-1}$ for an electric discharge surface having an area of around 25 cm$^2$.

The gas supply means also desirably has outlet means formed and arranged to produce relatively small bubbles in the liquid, in use of the apparatus, with, for example, a bubble diameter in the range from 0.1 to 10 mm, preferably from 0.5 to 5 mm, advantageously from 0.7 to 3 mm.

Various gases may be used including more or less inert gases such as noble gases e.g. argon or nitrogen. Most conveniently and economically though there may simply be used air or oxygen which also have the advantage that they give rise to the production of ozone which can in turn allow the production of free radicals which can have further beneficial effects in the inactivation of contaminants.

The first and second electrodes may have various shapes and configurations depending inter alia on the shape and configuration of the electric discharge surface. Where this is generally annular, then the opposed portions of the first and second electrodes at respective end portions of the electric discharge surface may also conveniently be annular but this is not essential. With an annular electric discharge surface the secondary electrodes are also conveniently generally annular. Other configurations are also possible though which may have possible advantages, for example, in relation to generation of a more homogenous electric discharge and/or increased electrode life. Thus, for example, the secondary electrodes may be in the form of multiplicity of metallic or other electrically conducting particles embedded in or attached to the surface of an electrically insulating substrate. The particles may have various shapes or sizes, for example, from 0.1 mm to 5 mm in diameter, conveniently from 0.2 mm to 0.3 mm in diameter, and may be rounded, but more conveniently are angular, for example polygonal, regular or irregular, star-shaped etc. The particles are generally spaced apart at a separation not less than their diameter, but conveniently of a similar order of magnitude. This type of arrangement has the advantage of generating a much larger number of electric spark discharge routes thereby yielding a more homogeneous electric discharge zone.

In general it is desirable that there should be used an inter-electrode gap between neighbouring electrodes of at least 1 to 2 mm in order to ensure that an electric spark discharge occurs (i.e. substantially without electrical energy passage by other means). Larger gaps, for example up to 10 mm or more may be used without significantly increasing the threshold voltage—typically of the order of 10 kV, and are generally preferred as they provide a more extended electric spark discharge and zone. Preferably there is used an electrode gap of from 3 to 8 mm. Larger gaps may also be used but these will tend to require higher threshold voltages.

The electrical power supply control means is generally formed and arranged for conditioning a suitable available electrical power supply, in generally known manner, so as to apply across said first and second electrodes, a series of high voltage DC pulses. The voltage required to initiate and maintain an electric discharge may also be affected to some extent by various factors such as the shape and configuration of the electric discharge surface, the shape and configuration of the first and second electrodes and the secondary electrodes, as well as the number of the latter, and the liquid used. In addition we have found that by further increasing the applied voltage above the minimum threshold voltage required to initiate electrical discharge, it is possible to modify the spectral distribution of the UV radiation produced. More particularly we have found that higher voltages produce more higher energy shorter wavelength UV radiation i.e. the wavelength peak is shifted to shorter wavelengths e.g. from around 260 nm which is particularly useful for inactivating bacteria and other micro-organisms, down to around 180 nm which is more useful for removing formaldehyde and phenols. In addition at such shorter wavelengths there may be produced in water, new compounds such as $H_2O_2$ and/or $O_3$ which have oxidising properties and may provide further sterilisation of water and/or removal or inactivation of other undesirable contaminants. In general there is used a voltage of at least 10 kV, usually from 10 kV to 50 kV.

The pulses may be applied at a range of different frequencies depending on, for example, the nature of the contaminant. Thus, for example, a higher pulsing rate may be desired where a shorter treatment time is required albeit at the cost of a higher power input requirement, or where the shock wave effect is considered particularly significant in the treatment. In general there is used a pulse rate which is sufficient to maintain a substantially continuous discharge. Conveniently there may be used a pulse rate of from 1 to 200 Hz, e.g. from 1 to 100 Hz.

In a further aspect the present invention provides a method of producing an electric discharge in a liquid comprising the steps of: providing an apparatus of the invention coupled to an electrical power supply and a gas supply means; providing a body of said liquid between said first and second electrodes; and applying a series of high voltage pulses to the first and second electrodes of the electric discharge device of said apparatus while feeding gas into said body of liquid.

In a yet further aspect the present invention provides a method of producing an electric discharge in a liquid comprising the steps of: providing a first form of apparatus of the invention coupled to an electrical power supply and a gas supply means; substantially immersing the electric discharge surface of the electric discharge device in the liquid; and applying a series of high voltage pulses to the first and second electrodes of the electric discharge device of said apparatus while feeding gas to the electric discharge surface thereof.

In yet another aspect the present invention provides a method of treating a liquid containing at least one hazardous contaminant, so as to decontaminate effectively the liquid said method producing and maintaining an electric discharge in said liquid by means of a method according to the present invention, for a period of time sufficient substantially to modify at least one said contaminant into a more benign form.

In accordance with the present invention the contaminant modification may have various different forms depending on the nature of the contaminant. In the case of micro-organisms the required modification should generally be at least sufficient to prevent effective propagation or reproduction of the micro-organism. In the case of cellular organisms such as bacteria, suitable modification may or may not involve cell disruption. Various microbial contaminants may be inactivated by means of the present invention such as *E. coli, Pseudomonas aeruginosa*, Cryptosporidium, etc.

With organo-chemicals suitable modification comprises reaction of the contaminant so as to convert it into another species which is environmentally benign per se and/or which is more or less readily bio-degradable into an environmentally benign form. The method of the invention may also be used effectively to inactivate inorganic contaminants such as metal salts and especially heavy metal salts, by converting them into an insoluble form which can be more or less readily precipitated out of the liquid.

The decontamination method of the invention may be carried out in either a continuous treatment mode or a batch treatment mode. In the latter case the liquid to be decontaminated should generally be confined in a chamber around the electric discharge device (or in a closed circuit including said chamber and liquid circulation means for circulating the liquid through the chamber)so that substantially the whole of the liquid is brought inside or into close proximity with the electric discharge zone for an effective period of time sufficient for substantial inactivation of the contaminants. The first preferred form of apparatus of the invention is generally most convenient for such treatment. The electric discharge itself will generally provide a more or less substantial degree of mixing of the liquid in the chamber but if desired additional mixing means may be provided. In the case of a continuous treatment mode the apparatus of the invention would generally comprise a liquid containment means having an inlet for liquid to be treated, a treatment zone inside which the electric discharge surface of the electric discharge device is disposed, an outlet for treated liquid, and liquid flow control means for regulating the flow of said liquid through the liquid containment means. The second preferred form of apparatus of the invention is generally most convenient for this.

The treatment time (discharge operation time for batch mode, or residence time in the electric discharge zone for continuous mode) will depend on various factors such as the nature of the liquid, and the nature and concentration of the contaminant(s), as well as the energy of the electric discharge. Suitable times can be readily determined by suitable trial and error for any given situation (device power and configuration, contaminant nature and loading thereof, required reduction in contaminant loading, etc.).

In order to increase efficiency in treatment of at least some contaminants of the liquid it may be desirable to control other variables as well. Thus for example in the treatment of water to inactivate micro-organisms it is preferred to use gas containing significant amounts of oxygen, and desirably to use alkaline pH values in the liquid undergoing treatment, typically from 7 to 11, preferably from 8 to 10, conveniently by means of adding alkali such as sodium hydroxide, in order to increase ozone generation and dissociation thereof to produce free radicals.

If desired, the treatments of the present invention may be combined to a greater or lesser extent with other possible treatments. Thus for example, the liquid being treated may also be heated in order to provide a more intensive and/or efficient treatment of the liquid. Also the liquid may be passed through a micro-filter.

In yet another aspect the present invention provided an apparatus suitable for use in the treatment of a liquid comprising a high voltage electric discharge device with a first electrode and a second electrode spaced apart from said first electrode and a multiplicity of spaced apart secondary electrodes distributed between opposed portions of said first and second electrodes across an electric discharge zone of said device, said discharge device including electrical power supply control means formed and arranged for applying a series of high voltage pulses across said first and second electrodes in use of the apparatus with said device connected to an electrical power supply so as to produce an extended area electrical discharge, said apparatus including a gas delivery means formed and arranged for feeding gas to said electric discharge zone in use of said apparatus with said electric discharge zone immersed in said liquid.

BRIEF DESCRIPTION OF THE DRAWINGS

Further preferred features and advantages of the invention will appear from the following detailed description given by way of example of some preferred embodiments and their use illustrated with reference to the accompanying drawings in which.

DESCRIPTION OF THE PREFERRED EMBODIMENTS

Figure 1:
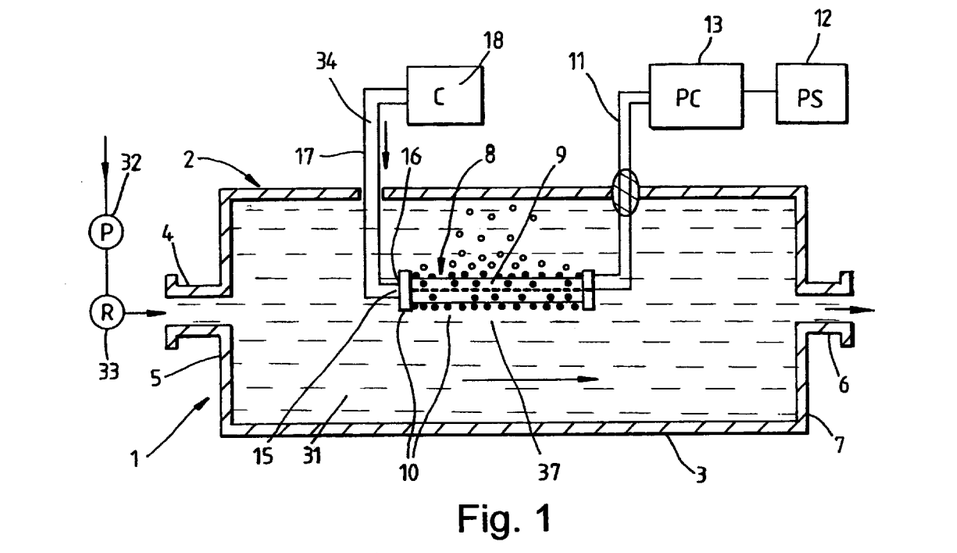
FIG. 1 is a schematic side elevation of a first type of water treatment system of the invention.

FIG. 1 shows a water treatment system of the first form of apparatus of the invention 1 comprising a liquid containment vessel 2 in the form of an elongate chamber 3 having an inlet 4 at one end 5 and an outlet 6 at the other end 7. An electric discharge device 8 comprises an elongate body 9 mounting a series of electrodes 10 connected 11 to a high voltage power supply PS 12 via a power control means PC 13. The elongate body 9 has an internal passage 14 (see FIG. 2) and an air inlet 15 at one end 16 connected 17 to an air compressor C 18.

Figure 2:
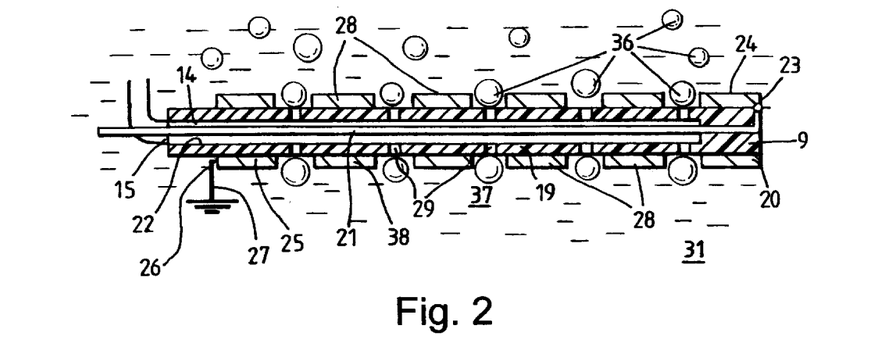
FIG. 2 is side elevation of a principal part of the electric discharge device of a first embodiment.

As shown in more detail in FIG. 2, the elongate body 9 comprises a hollow tube 19 of polytetrafluoroethylene, or other dielectric material with high voltage threshold breakdown (e.g. ceramic), with said air inlet 15 at said one end 16 and closed at its other end 20. An electric conductor 21 extends along the hollow interior 22 of the tube 19 and passes through said closed end 20 to be connected 23 to a first ring electrode portion 24 mounted on said closed end 20. A second ring electrode 25 is mounted on the open end 16 of the tube 19 and has connected 26 to it a return conductor 27. A series of more or less closely spaced apart secondary ring electrodes 28 is mounted on the tube 19 between said first and second electrodes 24,25. A series of small bores 29 extends through the wall 30 of the tube 19 from the central passage 14 and exiting between neighbouring electrodes 24, 28, 25. In more detail the first electrode portion, the second electrode, and the secondary electrodes were each in the form of a titanium ring having a diameter of ca. 10 mm, and axial length of 10 mm, and a thickness of 2 mm, with an interelectrode gap of 2 mm therebetween.

In use of the apparatus liquid 31 is passed through the chamber 3 by means of a pump P 32 with a flow regulator R 33 for adjusting the liquid flow rate and air 34 is pumped into the tube 19 from which it escapes via the bores 29 as small bubbles 36. Once the tube 19 has been filled with air, the power supply 12 and power control means 13 may be activated to apply high voltage electric pulses to the first and second electrodes 24,25 to establish an electric discharge in an electric discharge zone 37 extending around the outer electric discharge surface 38 of the tube 19.

Figure 3:
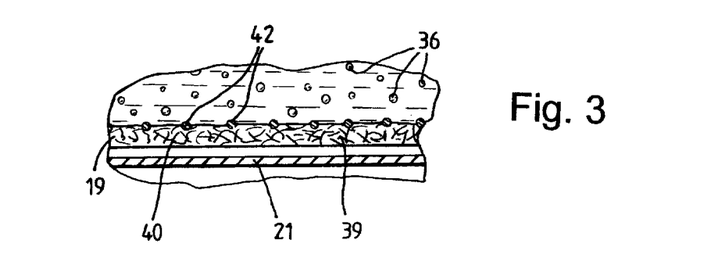
FIG. 3 is a detail side elevation of part of an electric discharge device of another embodiment.
Figure 4:
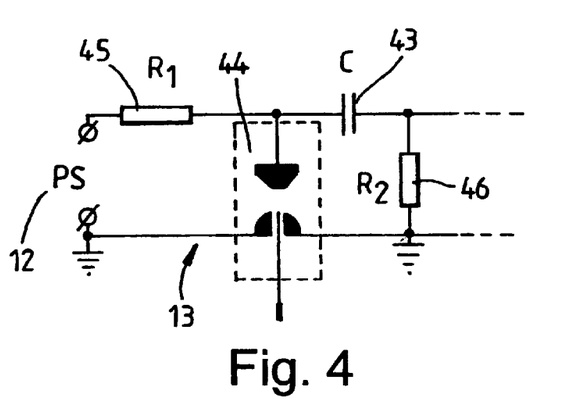
FIG. 4 is partial schematic circuit diagram of the principal parts of the power control means of the apparatus of FIG. 1.

FIG. 3 shows another embodiment where the wall 39 of the tube 19 is porous defining a multiplicity of small passages 40 therethrough. On the outer surface 41 of the tube is embedded a large number of small particles of metal 42 constituting secondary electrodes which has the advantage of yielding a more homogeneous electric discharge over the electric discharge surface. In other respects the embodiment of FIG. 3 may be substantially similar to the first described embodiment. FIG. 4 shows the principal parts of the power control means 13 comprising a capacitor 43 in which charge is built up from the power supply means 12 prior to application to the electric discharge device 8 and discharge therethrough upon activation of a switch means 44. The circuit also includes suitable resistor means 45,46. Typically there are used particles 42 having a diameter of the order of 0.1 to 0.3 mm which are spaced apart from each other—preferably by a distance not less than the particle diameter.

Figure 5:
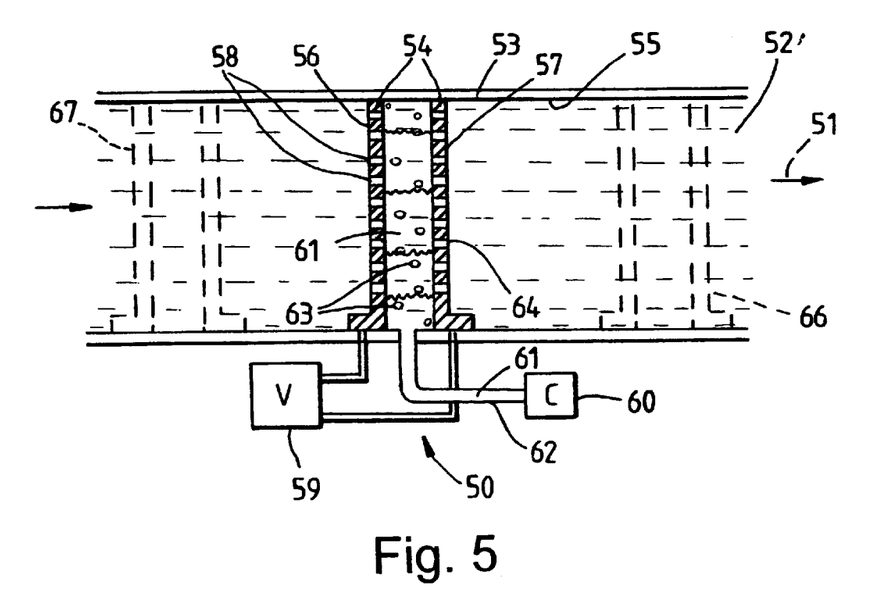
FIG. 5 is a schematic side elevation of a second type of water treatment system of the invention.

FIG. 5 shows schematically a preferred embodiment of the second form of the apparatus of the invention suitable for use in the treatment of a continuous flow 51 of water 52 through a pipeline 53. In more detail, the apparatus comprises a pair of disc form members 54, conveniently of stainless steel, mounted transversely across the interior 55 of the pipeline 53, approximately 1 cm apart and constituting the first and second electrodes 56, 57. The disc form electrodes 56, 57 are perforated with a multiplicity of more or less regularly and closely spaced apart apertures 58 through which the water flow 51 passes in use of the apparatus. The electrodes 56, 57 are connected to a high voltage pulse generator 59 similar to that described hereinabove, and a compressor 60 injects air 61 via a conduit 62 into the pipeline 53 so as to provide a stream of small bubbles 63 of air rising between the opposed first and second electrodes 56,57.

In use of the apparatus 50, when a high voltage pulse is applied an electric discharge spark 64 is initiated at a rising gas bubble and extends through the water between opposed portions of the first and second electrodes 56,57 creating an arc discharge in the water. After the spark 64 has died, the gas bubble continues to rise through the water 52. Since the gas in this bubble has become ionised, it is now easier to initiate an electric discharge spark at that bubble when the next high voltage pulse is applied. Thus a series of electric discharge sparks 64 is repeatedly induced at various positions across the pipeline thereby subjecting the water in the pipeline to the various powerful effects (intense UV radiation, acoustic/shock waves, free radicals etc. as discussed hereinbefore) thereby providing a particularly effective inactivating treatment of micro-organisms etc. present in the water 52. As the bubbles 63 are subjected to repeated electrical discharges they tend to dissolve in the water and thus not to accumulate inside the pipeline. Nevertheless, if desired, means may be provided for venting or otherwise removing any spent gas bubbles. In any event we have found that the apparatus performs satisfactorily even if a significant part of the pipeline cross-section is occupied by gas.

It will be appreciated that the main treatment effect is obtained in the general vicinity of the electric discharge zone 65 between the opposed first and second electrodes but can extend to a significant distance from the discharge zone (possibly up to 200 cm or more in clear drinking water) and that the water flows continuously through this electric discharge zone 65. Accordingly in order to ensure that all of the water flowing through the pipeline receives an effective treatment, especially in the case of high flow rates, it maybe desirable to provide additional electrode pairs 66,67 (connected to the same high voltage pulse supply 59 or with independent supplies and/or to use a higher frequency pulse discharge. The spacing between neighbouring pairs may be selected relative to the water flow rate so that each and every portion of the water flow is subjected to a plasma discharge treatment time of a desired duration, which may moreover be effected in only one electric discharge zone 65 or inside multiple electric discharge zones. Thus it will be appreciated that it is in principle possible to achieve effective treatment with quite high flow rates.

It will also be understood that by varying the amount of gas injected it is possible to affect the number of discharge pulses initiated between the electrodes in the case of smaller numbers of bubbles being injected, and minimisation of excess unused air being injected with higher numbers of bubbles being injected.

Figure 6:
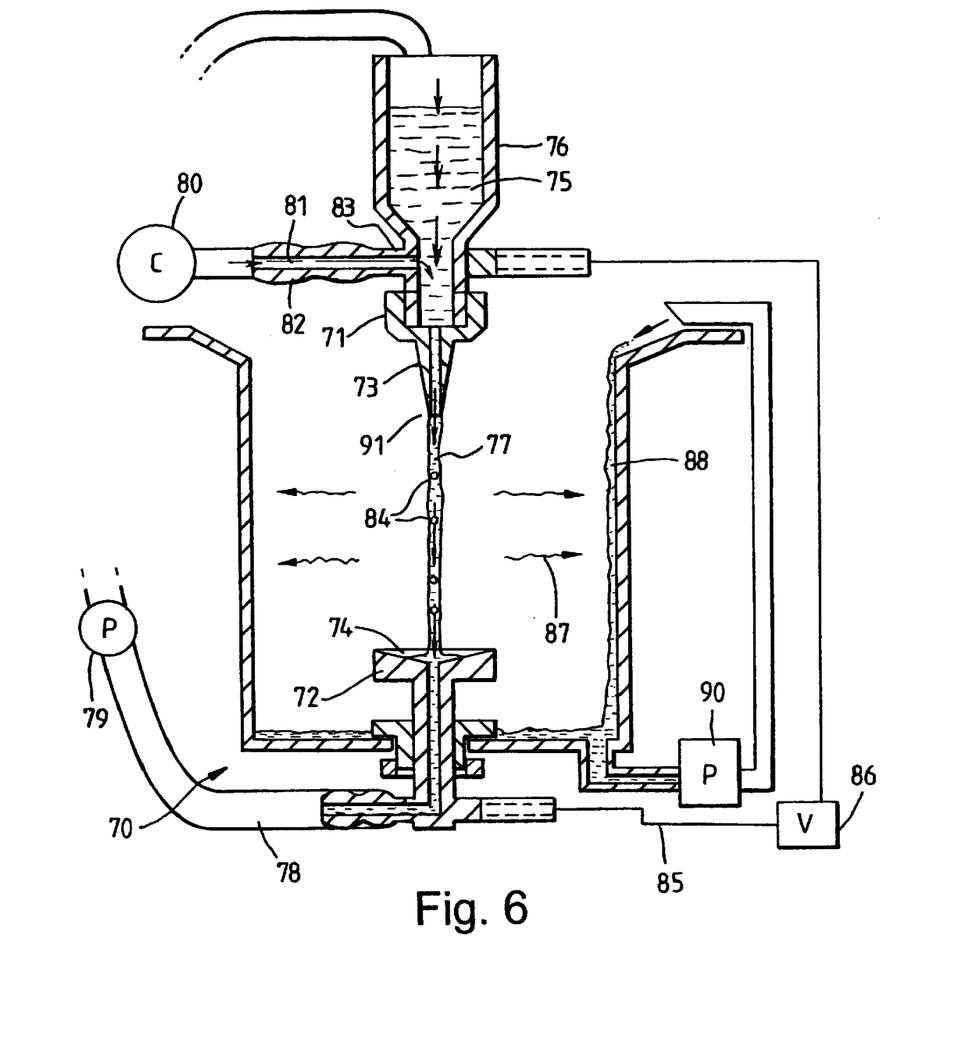
FIG. 6 is a schematic side elevation of a third type of water treatment system of the invention.

FIG. 6 is a schematic view of a preferred embodiment 70 of the third form of the apparatus of the invention suitable also for use in the treatment of liquids without the generation of plasma discharge and effects such as pressure shock waves inside those liquids. In more detail, this apparatus 70 has opposed first and second electrodes 71,72, in the form of a downwardly directed nozzle 73 and a funnel shaped collector 74 disposed below the nozzle 73. Water 75 is supplied to the nozzle 73 from a reservoir 76. A stream or jet 77 of water extends from the nozzle 73 to the receptacle 74 there it is collected and returned to the reservoir via a return pipe 78 provided with a pump 79. A compressor 80 pumps in air 81 immediately upstream of the nozzle 73 so as to inject a stream of gas bubbles into the water stream 77. As before the first and second electrodes 71,71 are connected 85 to a high voltage pulse supply 86.

In use of the above described apparatus an electric plasma discharge is generated inside and along the length of the water stream 77 thereby treating the water inside the stream. In addition though the intense UV radiation 87 emitted from the water stream 77 can be used to irradiate and treat a separate body of water 88 circulated inside a vessel 89 surrounding the water stream 77, with the aid of a pump 90.

With this embodiment the separation between the two electrodes—more particularly the tip 91 of the nozzle 73 and the funnel receptacle mouth 74, which typically is of the order of 10 cms, can be readily adjusted by raising or lowering one or other (or both) of the electrodes 71, 73, for example, in order to increase the size of the discharge zone—using a higher voltage to initiate the discharge as required.

Figure 7:
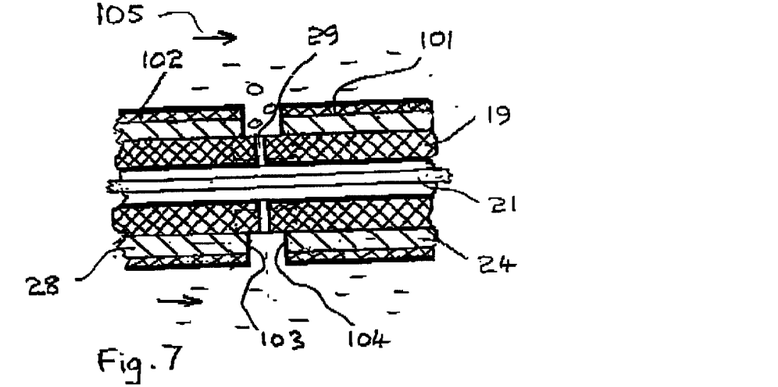
FIGS. 7 to 9 are detail views corresponding to part of FIG. 2 of three modified forms of the device of the first embodiment.
Figure 8:
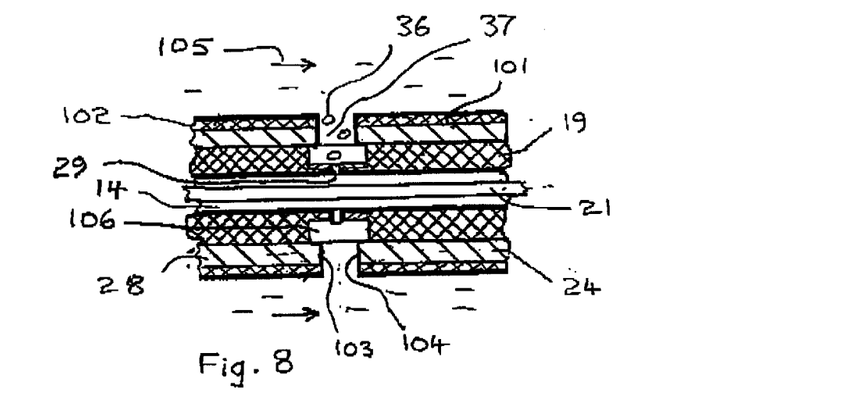
Figure 9:
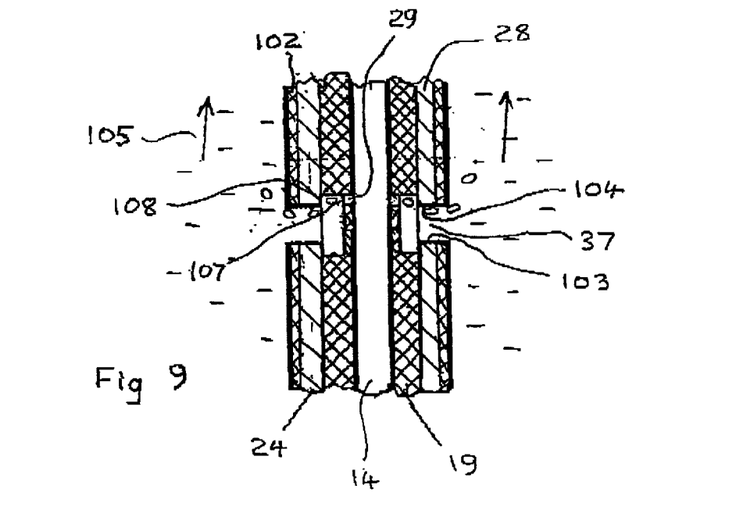

FIGS. 7 to 9 are detail views corresponding to part of FIG. 2 of three modified embodiments of the first form of the invention, in which like parts corresponding to those of FIG. 2 have been indicated by like reference numbers.

In FIG. 7 the outer cylindrical surfaces 101 of the electrodes 24,28 are covered by a solid dielectric tubular insulator 102, conveniently of PTFE. Thus only the opposed annular end face portions 103,104 of the ring form electrodes 24,28, are exposed to contact with the liquid flow 105 which is being treated by the apparatus.

The apparatus of FIG. 8 is generally similar to that of FIG. 7 with the outer cylindrical surfaces 101 of the electrodes 24,28 covered by a solid dielectric tubular insulator 102. In this case though annular grooves or channels 106 are provided in the hollow tube 19 of dielectric material on which the electrodes 24,28 are supported, below and slightly behind the opposed annular end face portions 103,104 of the ring form electrodes 24,28. The small bores 29 extending from the central gas supply passage 14 inside the hollow tube 19 exit into these channels 106 so that the gas bubbles 36 can begin to mix with the liquid flow 105 before the bubbles 36 enter into the electric discharge zone 37 between the opposed annular end face portions 103,104 of the ring form electrodes 24,28, whereby a more effective distribution of the gas bubbles 36 in the liquid 105 inside the electric discharge zone 37 can be obtained. In this case there are provided four equiangularly distributed small bores 29 (albeit that smaller or preferably larger numbers could also be used), which feed gas bubbles 36 into the annular channels 106 and electric discharge zones 37. It will be understood that gas bubbles 36 exiting from a downwardly directed small bore 29 will be initially retained within into the annular channels 106 and electric discharge zones 37 as they rise upwardly around the side of the hollow tube 19 at the base of the annular channel 106.

In the apparatus of FIG. 9 the electrodes 24,28 are again provided with an outer covering of insulator 102 (except at the opposed end face portions 103,104 and annular channels 106 are provided in the tubular support 19. In this case though, instead of the central tubular support 19 extending horizontally, it is arranged so as to extend generally vertically with an upward flow of liquid 105 around it. As with the FIG. 8 apparatus, channels 106 are provided in the tubular support 19. In this case though, the small bores 29 extending from the central gas supply passage 14 inside the hollow tube 19 are disposed so as to exit 107 into these channels 106 at the upper ends 108 thereof so that the gas bubbles 36 are less readily entrained by the upward liquid flow 105 whereby the residence time of the gas bubbles 36 inside the electric discharge zone 37 between the opposed annular end face portions 103,104 of the ring form electrodes 24,28. This helps to reduce the gas supply required to maintain an effective concentration of the gas bubbles 36 in the liquid 105 inside the electric discharge zone 37 thereby decreasing the overall power consumption and running costs of the apparatus. It may also be noted that in this case, unlike with the previous embodiments, the first electrode 24 does not have an electrical conductor portion 21 extending along the internal passage 14 inside the tubular insulator support 19, whereby said passage 14 provides a substantially unobstructed pathway for the gas supply to the electric discharge zone 37.

Various experiments were carried out using apparatus of the two principal types illustrated in FIGS. 1 to 5 as described hereinbelow. Two high voltage pulse supply devices having the following characteristics were used.

Type I—Peak voltage: $U \cong 40$ kV;
High-Voltage pulse duration: $T \cong 150$ ns;
Pulse energy: $W \cong 0.1$ J;
Frequency of pulses repetition: $f \cong 50-100$ Hz
Type II—Peak voltage: $U \cong 20$ kV;
High-voltage pulse duration: $T \cong 10$ $\mu$ps;
Pulse energy: $W \cong 2$ J;
Frequency of pulses repetition: $f \cong 50$ Hz
All chemical analyses and Cryptosporidium tests referred to in the following Examples were carried out by NAMAS accredited laboratories.

EXAMPLE 1

Treatment of Contaminated Water

A vessel was filled with water (1000 ml) to which 10 mg of parachlorophenol ($C_6H_4ClOH$) was added as an admixture and the Electric Discharge device substantially as described above was placed in the vessel. The electric discharge device used was of cylindrical geometry containing 5 ring electrodes made of titanium with a diameter of ca. 10 mm, a length of ca. 10 mm and width of ca. 2 mm. The 4 gaps between the electrodes had a clearance of ca. 2 mm each. The dielectric tube supporting the electrodes was made of ceramics. Air at approximately atmospheric pressure was fed in through the holes in the interelectrode gaps at a rate of approximately 30 l/h: 10 Hz, the period of irradiation— t=8 min. After the electric discharge treatment the content of parachlorophenol was found to have been decreased by 30%.

EXAMPLE 2

Treatment of Contaminated Water

Water (1 l) containing *E. coli* ($10^6$ organisms $l^{-1}$) was placed in a container and an electric discharge device according to FIGS. 1 and 2 of the invention was immersed therein. An electric discharge was produced in the water and maintained for 10 minutes at a pulse rate of 10 Hz at a voltage of 20 kV.

Results

After treatment for 10 minutes the population of *E. coli* was decreased to undetectable levels.

EXAMPLE 3

Treatment of Water containing: (I) Bacteria/(II) Protozoan oocysts

I—Bacterial Inactivation 2.5 liters of water is treated in an apparatus similar to that of FIGS. 1 to 4 and 5 liters in an apparatus similar to that of FIG. 5 with the water being continuously recycled through the pipeline. The water used was a 50x dilution of an activated sludge sample from an experimental waste water treatment plant. The amplitude of the high-voltage pulse was U=40 kV, the energy in the pulse was W=ca. 0.1 Joules, and the pulse rate was f=50–100 Hz using a Type I voltage pulse supply.

The water was placed inside the tank and the first sample was taken immediately prior to switching on the Voltage pulse supply. A total of five samples was taken each with a volume of approximately 30 ml. The samples were taken at 0, 10, 20, 30 and 40 min. Replicate analyses were carried out.

The samples were then processed to determine bacterial populations using the Miles-Misra plate counting technique and nutrient agar as the growth medium (Ref. 1). On each agar plate four drops of diluted sample of known volume (0.033) were placed using a pasteur pipette. The drops were then allowed to dry before incubation for 24 h at 28° C. after 24 h, the plates were checked for growth and the number of colony-forming units (CFU) $ml^{-1}$ of the original sample.

Similar changes in bacterial populations were determined using both the first and second types of apparatus.

| TIME | Bacterial Count (CFU*/ml) |
| --- | --- |
| 0 | 63,000 |
| 10 | 2,000 |
| 20 | 0 |
| 30 | 0 |
| 40 | 0 |

[85] *CFU-Colony Forming Units

II—Cryptosporidium Inactivation

Oocysts from the protozoan Cryptosporidium are resistant to conventional treatments such as chlorination and are not destroyed unless very high (and dangerous) concentrations of chemical are used.

1.5 liters of water containing 2000 oocysts per milliliter were treated in an apparatus similar to that in FIG. 5 with water being continuously recycled through the pipeline. Samples from the recirculating water were analysed for viable oocysts at the start and after 30, 60, 90 and 120 min.

Results

Viable oocysts could not be determined at the 30 minute sample time and thereafter. Evidence of oocyst wall destruction and other degradation was found.

EXAMPLE 4

Degradation of Pentachlorophenol

To 5 l of water was added to PCP to provide an initial concentration of 48.24 $\mu$g/l. The solution was treated using an apparatus similar to that of FIG. 5 with 3 electrode pairs spaced 14 cm apart from each other, but with only one electrode pair active i.e. with high voltage pulses being supplied to it. Samples were collected at timed intervals during the treatment for chemical analysis and for toxicity testing using Microtox(Ref. 2).

Results

The following results were obtained.

| Time (Min) | Pentachlorophenol (µg/l) | % Removed | Treatment efficiency per time period (%) |
|---|---|---|---|
| 0 | 48.24 | — | — |
| 30 | 27.04 | 44.0 | 44.0 |
| 60 | 23.13 | 52.1 | 14.5 |
| 90 | 20.74 | 57.0 | 10.3 |
| 120 | 18.00 | 62.7 | 13.2 |

After treatment for one hour, 57.0% of the pentachlorophenol was degraded and 62.7% degradation occurred after two hours of treatment.

EXAMPLE 5

Degradation of 4-Chlorophenol

A similar procedure to that of Example 4 was carried out using water to which 4-CP had been added to provide an initial concentration of 376.11 µg/l.

Results

The following results were obtained.

| Time (Min) | 4-Chlorophenol (µg/l) | % Removed | Treatment efficiency per time period (%) |
|---|---|---|---|
| 0 | 376.11 | — | — |
| 20 | 327.25 | 13.0 | 13.0 |
| 30 | 321.52 | 14.5 | 5.7 |
| 60 | 284.07 | 24.5 | 37.5 |
| 150 | 201.05 | 46.6 | 29.2 |

After treatment for one hour, 24.5% of the 4-CP was degraded and most degradation occurred after the first hour of treatment.

No toxicity was evident in the treated liquid containing 4-CP.

EXAMPLE 6

Degradation of Formaldehyde

A similar procedure to that of Example 4 was carried out using the effluent sample volume of 5 liters of water contaminated by formaldehyde (64 mg $l^{-1}$).

After treatment for two hours, 10% of the formaldehyde was found to have been degraded.

EXAMPLE 7

Degradation of Ammoniacal Nitrogen

The effluent sample volume of 5 liters of water contaminated by ammoniacal nitrogen (90 mgl$^{-1}$) which was then treated using a similar apparatus to that in example 4.

After treatment for two hours 50% of the ammoniacal nitrogen was found to have been degraded with most degradation occurring during the first hour of treatment.

EXAMPLE 8

Degradation of Industrial Dyes

A sample of dark coloured industrial effluent containing dyes and heavy metals (Cd, Cr, Cu, Pb, Ni, Zn) was diluted in water 1:50 to provide 5 liters of contaminated water which was then treated using a similar apparatus to that in example 4. Samples of the treated water were recovered at timed intervals and assayed by means of visible light absorbance.

Results

Absorbance measurement at different wavelengths between 400 and 700 nm were made of the treated 1:50 dilution of the strongly coloured industrial effluent contained dyes and metals. It was found that treatment led to a decrease in absorbance at all wavelengths tested indicating colour and metal reduction. An unusual finding was the initial increase in absorbance after 30 min treatment. This may have been due to production of fine metal particulates caused by the highly oxidised environment.

| Time (Min) | Absorbance at Wavelength (nm) | | | | | | |
|---|---|---|---|---|---|---|---|
| λ | 700 | 650 | 600 | 550 | 500 | 450 | 400 |
| 0 | 2.47 | 2.87 | 3.28 | 3.65 | 3.87 | 4.15 | 4.38 |
| 30 | 2.87 | 3.35 | 3.83 | 4.28 | 4.56 | 4.87 | 5.13 |
| 60 | 2.67 | 3.12 | 3.57 | 4.00 | 4.25 | 4.53 | 4.81 |
| 120 | 2.56 | 2.99 | 3.42 | 3.84 | 4.08 | 4.35 | 4.59 |
| 180 | 2.30 | 2.69 | 3.09 | 3.46 | 3.67 | 3.91 | 4.13 |

Literature References

1. Miles, A. A. & Misra, S. S. (1938). The estimation of the bacterial power of the blood. Journal of Hygiene, Cambridge, 38, 732–749.

2. AZUS Environmental (1997).Microtox Manual Volumes 1–4. Microbics Corporation. 2232 Rutherford Road Carlsbad, Calif.

What is claimed is:

1. An apparatus suitable for use in the treatment of a liquid, said apparatus comprising a high voltage electric discharge device with a first electrode and a second electrode spaced apart from said first electrode, and dielectric support members for said first and second electrodes, with exposed opposed portions of said first and second electrodes each having a dielectric—electrode interface between the respective electrode and said support dielectric member, whereby a local increase in electric field strength is induced at said exposed opposed electrode portions adjacent said dielectric support member during use of the apparatus, thereby facilitating electric discharge initiation, said discharge device including electrical power supply control means formed and arranged for applying a series of high voltage pulses across exposed opposed portions of said first and second electrodes when said device is connected to an electrical power supply, so as to produce and maintain an extended area electrical discharge in an electric discharge plasma zone extending between said exposed opposed portions of said first and second electrodes, said apparatus including a gas delivery means formed and arranged for feeding a series of bubbles of gas into a body of liquid in said electric discharge zone in direct contact with said exposed opposed portions of said first and second electrodes, and wherein said first and said second electrodes are in the form of generally planar members in opposed relation, each having a plurality of apertures therein for the passage of said liquid through the first electrode and then the second electrode via said electric discharge zone extending there between.

2. An apparatus according to claim 1 wherein a multiplicity of said apertures are distributed substantially uniformly across said electrodes.

3. An apparatus according to claim 2 wherein said apertures have an area comprising from 30 to 98% of the total area of the electrodes.

4. An apparatus according to claim 1 wherein said apparatus comprises a plurality of first and second electrode pairs substantially spaced apart from each other.

5. An apparatus according to claim 4 wherein each electrode pair is spaced from a neighbouring electrode pair by from 2 to 10 cms.

6. An apparatus according to claim 1 wherein the or each first electrode is spaced from the opposed second electrode by from 0.2 to 2 cms.

7. An apparatus according to claim 1 wherein said electrical power supply control means is formed and arranged for applying said high voltage pulses at a voltage of from 10 kV to 50 kV.

8. An apparatus according to claim 1 wherein said electrical power supply control means is formed and arranged for applying said high voltage pulses at a frequency of from 1 to 200 Hz.

9. An apparatus according to claim 1 wherein said electrical power supply control means is formed and arranged for applying said high voltage pulses with a pulse energy of from 0.01 to 50 J per pulse.

* * * * *